INVENTOR:
George W. Jessup Jr.
by MacLeod, Calver, Copeland & Dike.
Attys.

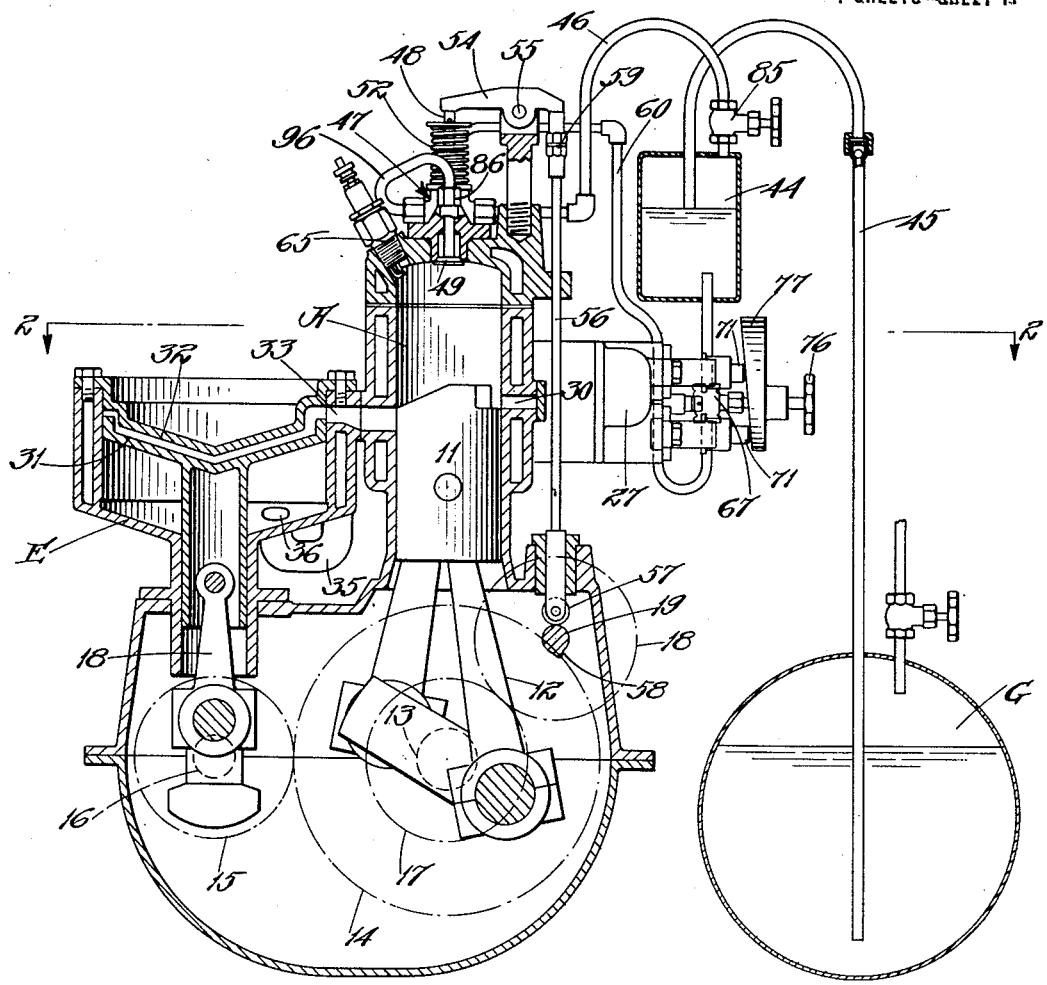
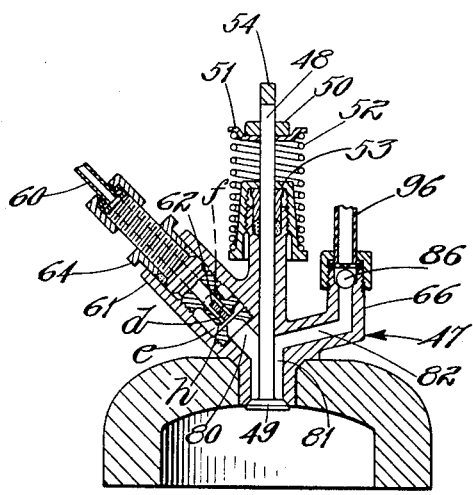
Fig.1.
Fig.4.

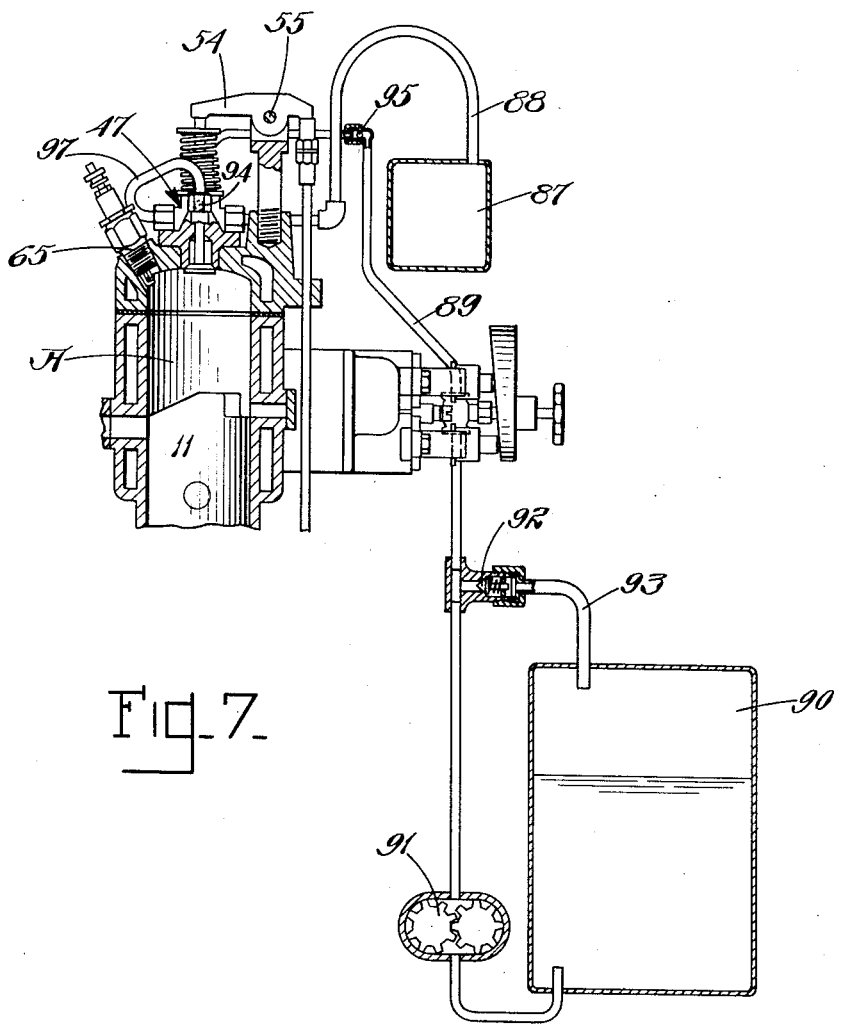

UNITED STATES PATENT OFFICE.

GEORGE W. JESSUP, JR., OF NEWTON, MASSACHUSETTS.

INTERNAL-COMBUSTION ENGINE.

1,406,391. Specification of Letters Patent. Patented Feb. 14, 1922.

Application filed June 1, 1917. Serial No. 172,296.

*To all whom it may concern:*

Be it known that I, GEORGE W. JESSUP, Jr., a citizen of the United States, residing at Newton, county of Middlesex, State of Massachusetts, have invented a certain new and useful Improvement in Internal-Combustion Engines, of which the following is a specification, reference being had therein to the accompanying drawings.

My invention has for its object an internal combustion engine which shall be more efficient than engines of this type as heretofore constructed and which shall not be subject to certain objections heretofore commonly experienced.

My invention has been made with the two-cycle type of internal combustion engine particularly in mind, but certain features of it are also capable of embodiment in engines of other types, as for instance four-cycle engines. In the drawings, I have shown it as embodied in a two cycle engine because that is the type in which I have employed my invention in actual practice.

In two cycle engines, great difficulty has been experienced in expelling completely the exhaust gases from the cylinder after each explosion and in preventing the explosive mixture which comes in through the in-take port becoming entangled with the exhaust gases with a resulting loss of economy. This difficulty has resulted from the fact that the explosive mixture enters the cylinder through the inlet port while the exhaust gases are being expelled through the exhaust port. To overcome these difficulties, I introduce compressed air unmixed with the fuel directly into the cylinder, the admission of the air occurring while the exhaust port is still open so that the exhaust gases are blown through the cylinder and the cylinder is swept clean. About the time the exhaust port has closed, the fuel begins to be introduced, preferably in an atomized condition directly into the top of the cylinder so that there is no possibility of its becoming mingled with the spent gases, or any part of it being lost through the exhaust port.

Another feature relates to mechanism by which the fuel is injected under pressure into the cylinder without the use of a separate fuel pump, capable of injecting the fuel into the cylinder under the pressure therein.

Another feature of my invention relates to an atomizer by means of which the liquid fuel is introduced into the working cylinder.

The invention will be fully understood from the following description taken in connection with the accompanying drawings and the novel features thereof will be pointed out and clearly defined in the claims at the close of this specification.

In the drawings, Fig. 1 is a transverse section through the working and compound cylinders of an engine embodying my invention. Said figure also includes in section portions of the valve mechanism and the fuel supply mechanism.

Fig. 4 is a section on a larger scale showing the atomizer and related parts.

Fig. 7 is a section showing a modification of the mechanism for injecting the fuel.

Figure 2:
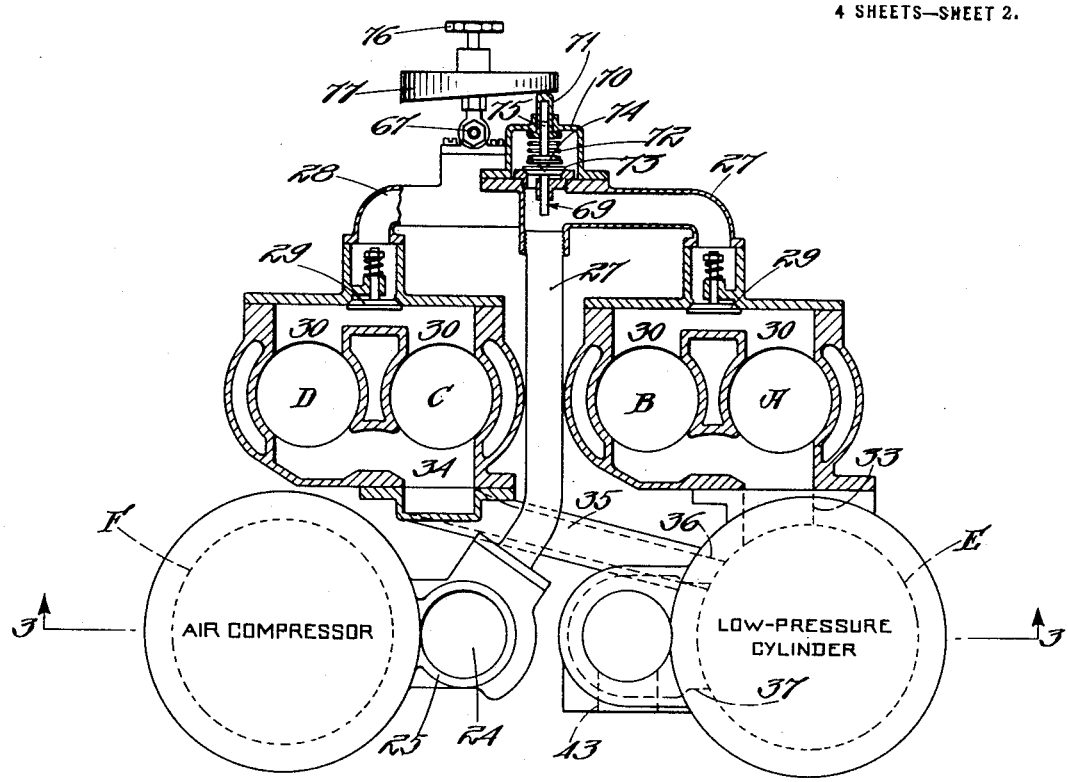
Fig. 2 is a horizontal section on line 2—2 of Fig. 1.
Figure 6:
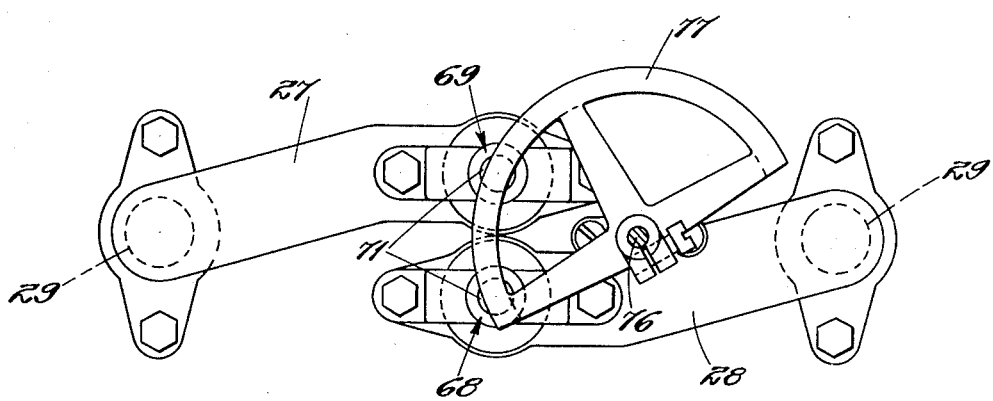
Fig. 6 is a detail view of the relief valve regulating mechanism.
Figures 3, 5:
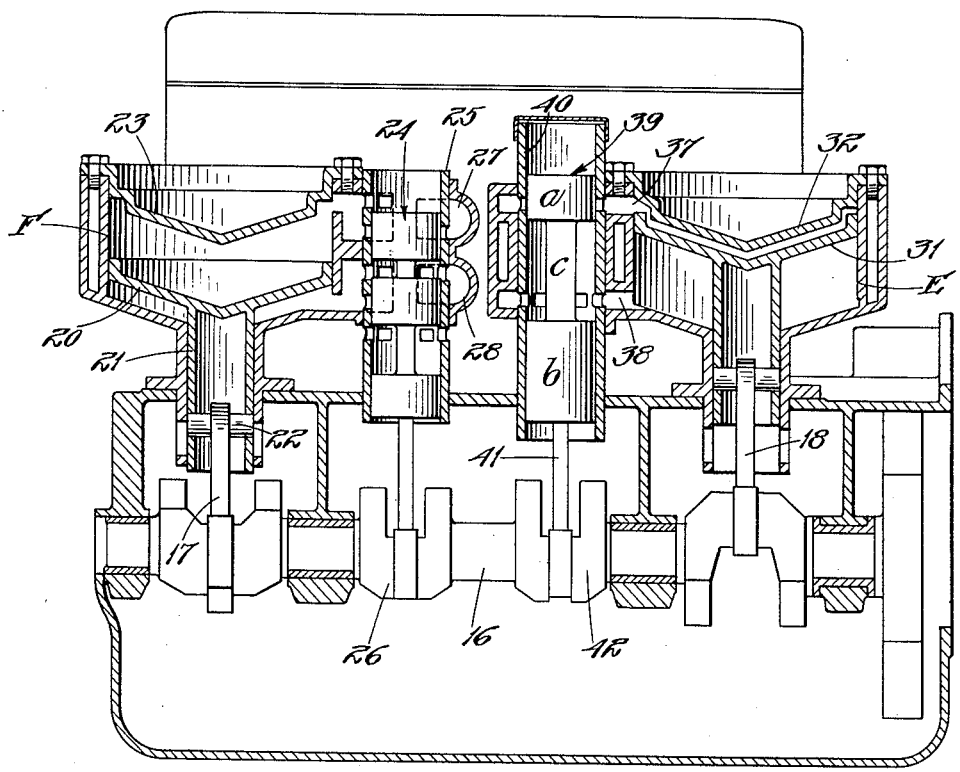
Fig. 3 is a longitudinal section on line 3—3 of Fig. 2 showing the air compressor, the low pressure working cylinder and the valve mechanisms therefor.
Fig. 5 is a plan view of the atomizer and related parts.

In the drawings, I have shown my invention as embodied in a two cycle engine having four main cylinders, A, B, C and D and one double acting low pressure cylinder E, there being one double acting air compressor F which supplies the compressed air to all four main cylinders. The main cylinders A, B, C and D are provided with pistons 11 of ordinary shape, only one of which is shown in Fig. 1, and connecting rods 12 the latter being connected to the main crank shaft 13 of the engine. The main crank shaft 13 is connected by gears 14 and 15 with the compressor crank shaft 16 to which are connected the connecting rod 17 of the air compressor and the connecting rod 18 of the low pressure cylinder E. The sizes of the gears 14 and 15 are such that the compressor shaft 16 will make two revolutions for each revolution of the main crank shaft 13 of the engine. The main crank shaft is connected by gears 17 and 18 with the cam shaft 19 which operates the inlet valves of the main cylinders as will be later explained.

The air compressor piston 20 is of conical shape and is provided with a tubular stem 21 which is connected by a wrist pin 22 to the connecting rod 17. The cylinder head 23 of the compresser cylinder F is of a complementary conical shape. At 24 is shown a piston slide valve operating in a tubular housing 25 and actuated by a crank 26 on the compressor crank shaft 16. At 27 and 28 are shown two pipes or conduits leading from the upper and lower ends respectively of the compressor cylinder F. The pipe 27 connects with the cylinders A and B, while the pipe 28 connects with cylinders C and D. In each of these pipes there is placed a spring controlled check valve 29 to prevent any flow of air or gas through the respective pipes in the reverse direction. The air from the air compressor enters the main cylinders A, B, C and D through inlet ports 30 one of which is seen in elevation in Fig. 1. The low pressure cylinder E is shaped substantially like the the compressor and has a conical piston 31 and complementary conical cylinder head 32. It is connected by a port 33 with the cylinders A and B and by a port 34, pipe 35, and port 36 with the cylinders C and D. The port 33 enters the low pressure cylinder near the top while the port 36 enters the low pressure cylinder near the bottom so that the exhaust gases from the cylinders A and B are delivered to the top of the piston 31 while the exhaust gases from the cylinders C and D are delivered to the underside of the piston 31. The exhaust ports 37 and 38 respectively are opened and closed by a piston slide valve 39 operating in a casing 40 and actuated by a connecting rod 41 on a crank 42 formed on the compressor crank shaft 16. The exhaust valve is composed of two pistons $a$ and $b$ connected by a stem $c$. The final exhaust port is shown at 43. When the exhaust valve 39 is in its lowest position, the exhaust port 37 is closed and the exhaust port 38 is open; when the valve is in its upper position, the exhaust port 38 is closed and the port 37 is connected with the final exhaust port 43.

The liquid fuel is placed in a main tank G and flows from the main tank to the pressure tank 44 through the pipe 45. The supply in the tank 44 may be maintained by any suitable mechanism as for instance a by-pass pump, not shown. The upper part of the tank 44 is connected by a suitable pipe 46 with devices 47 located on the top of each cylinder A, B, C and D, which for convenience I call the atomizer heads. At 85 is shown a valve which may be closed to prevent loss of pressure from the system when the engine is not running. The atomizer head 47 supports the stem 48 of an inlet valve 49, by means of which the atomizer and the pipes leading to it are at times cut off from the working cylinder of the engine.

On the inlet valve stem 48 is a key 50 against which rests a socket 51 which receives one end of a valve spring 52, the other end of the valve spring being located on a thimble 53. The valve is operated by a rocker arm 54 pivoted at 55. The other end of the rocker arm 54 is engaged by a slide rod or valve tappet 56, on the lower end of which is a cam roll 57 engaging the cam 58 on the cam shaft 19. Provision for varying the length of the valve tappet for purposes of adjustment is afforded by the nuts 59.

From the tank 44, the fuel flows through a pipe 60 to the atomizer. This atomizer is formed in one branch of the atomizer head 47, the branch being numbered 61. The bore 80 of the branch 61, connects with the bore 81 about the inlet valve stem 48 and with the bore 82 in the branch 66. The atomizer comprises a plug 62, having a fuel orifice $d$ in the end of a nozzle $h$ which is surrounded by a space $e$. The space $e$ is supplied with compressed air from the top of the pressure tank 44 through a port $f$ and pipe 46, already described. The position of the nozzle of the atomizer may be adjusted slightly by screwing it in or out of the branch 61 of the atomizer head and the whole is kept tight by means of a stuffing box 64. It will be seen that the fuel is forced through the nozzle under pressure and at the same time the compressed air rushes through the port $f$ and past the end of the nozzle, breaking up the fuel into fine particles, and mixing it with the air entering the port $f$.

At 96 is shown a pipe which connects the branch 66 of the atomizer head 47 with the space $e$ about the atomizer. In this pipe 96 is located a check valve 86. This piping arrangement is such that the hot air under compression from the engine which is forced back into the tank 44 goes past the atomizer and keeps it heated thus preventing heat loss and producing better atomization. While I prefer this arrangement it is obvious that it is only essential that the space within the atomizer head be connected with the tank 44 by a pipe large enough to supply the necessary amount of compressed air and that the flow through the pipe be toward the tank. The pipes may be jacketed to prevent heat loss if desired.

At 65 is shown a spark plug by means of which the mixture in the cylinder is ignited.

The operation of the parts thus far described is as follows:—

It will be assumed that the piston is at the top of its stroke and that the explosive mixture contained in a main cylinder, as for instance the cylinder A, has just been ignited by a spark from the spark plug 65. The piston 11 descends until the exhaust port 33 into the low pressure cylinder E opens. The exhaust gases, which are still under a considerable pressure, the amount of which depends upon the design of the engine, are then admitted to the upper side of the low pressure piston 31 and exert pressure thereon, moving it downward. The exhaust gases do a certain amount of work as they expand. The diameter of the piston is proportioned to the pressure at which the gases are exhausted from the main cylinders into the low pressure cylinder. When the piston 31 has reached a predetermined position, the exhaust valve 39 connects the exhaust port 37 with the final exhaust port 43. At this time the main cylinder exhaust port 33 is still uncovered by the piston 11, and the air inlet port 30 has also been uncovered, so that pure air under pressure is injected into the main cylinder by the double acting compressor F. The engine is so designed that the inlet port 30 and exhaust port 33 are open simultaneously for a sufficient length of time to permit the clean air from the compressor to rush through the main cylinder and sweep it clean of the spent gases. On the up-stroke the exhaust port 33 is closed first by the piston 11 and then the inlet port 30. The fresh air in the cylinder which has been partly compressed by the air compressor is then compressed still further by the upward movement of the piston. At about the time when the piston 11 closes the exhaust port 33, the inlet valve 49 is opened by the cam 58, and the compressed air in the top of the tank 44 being under pressure greater than the pressure in the cylinder, injects fuel through the nozzle $h$ in a finely atomized condition into the top of the cylinder, the check valve 86 preventing the air entering through the branch 66 and pipe 96. The introduction of the fuel continues until the pressure in the cylinder A becomes greater than the pressure in the tank 44. Thereupon the check valve 86 lifts and compressed air, or more properly, a mixture of fuel and air flows back through the branch 66 and pipe 96 restoring the pressure in the top of the pressure tank 44. It will be understood of course that the valve spring 52 has a strength sufficient to hold the inlet valve 49 closed against the pressure in the tank 44 until it is opened by the action of the cam 58. The pressure of the air in the reservoir is regulated by the time the inlet valve 49 closes relatively to the position of the piston from the top of the stroke. The air is heated as a result of being compressed and by radiation from the cylinder walls.

This construction is such that no fuel or air pump capable of injecting fuel into the cylinder against the compression in the cylinder is required.

The speed of the engine is regulated by means of a fuel throttle valve 67, in the main fuel line and two air relief valves 68 and 69 one of which is located in the air pipe 27 connecting the air compressor with the cylinders A and B, and the other of which 68 is located in the air pipe 28 connecting the air compressor with the cylinders C and D. One of these relief valves is shown in detail in Fig. 2. It comprises a housing 70 in which is slidably mounted a thimble 71 which rests against the spring 72. The valve member 73 carries a collar 74 on the stem 75 and this collar 74 is engaged by the valve spring 72. The construction is such that whenever the air pressure in the pipe 27 rises above a point determined by the tension on the spring 72, the valve will lift and air will escape into the atmosphere, this preventing an increase in pressure above the predetermined point. At 76 is shown a handle having thereon a cam 77 which engages the two thimbles 71. The handle 76 is also connected with the fuel throttle valve 67.

The parts are arranged so that when the fuel throttle 67 is opened to increase the amount of fuel supplied to the engine, the tension on the springs 72 controlled by the position of the thimbles 71 will be correspondingly increased thereby increasing the pressure of the compressed air supplied to the engine. In this way the ratio of fuel and air may be maintained substantially constant at all loads and speeds of the engine.

It will be seen that all difficulty resulting from the intermingling of the fresh gases with the spent gases heretofore experienced in two cycle internal combustion engines is done away with, as the exhaust port is closed early enough to prevent escape of any fuel through the exhaust; that an open crank case i. e. one in which the operation of compressing the mixture is not performed, may be employed thus making possible the use of a simple and efficient lubricating system and doing away with the difficulties resulting from compression in a crank case. A low pressure double acting compressor may be employed since most of the work of compression is accomplished by the main piston itself and one double acting compressor will do the work for a four cylinder engine.

Other advantages will be apparent to engineers familiar with the design and operation of two cycle engines.

In Fig. 7, I have shown a slightly different arrangement of fuel feed. At 87 is shown an air tank in which no fuel is contained. This tank 87 is connected by pipe 88 with the atomizer head 47, there being provided a pipe 97 and check valve 94. The fuel nozzle $h$ of the atomizer is connected by pipe 89 directly with a fuel tank 90. In the pipe 89 is a rotary fuel pump 91 which maintains a constant pressure on the fuel in the pipe 89. At 92 is shown a relief valve connected with the tank 90 by a pipe 93. This relief valve controls the pressure of the fuel at the fuel nozzle $h$.

The operation of the mechanism shown in Fig. 7 is substantially the same as that shown in the preceding figures. During the first part of the compression stroke, the pressure in the air tank 87 being greater than that in the working cylinder, the air flows from the air tank through the atomizer breaking up the fuel which is delivered by the fuel jet. When the pressure in the working cylinder exceeds that in the air tank, the check valve opens and air under pressure flows directly into the air tank restoring the pressure therein.

The relief valve 92 is adjusted so that it will maintain a pressure in the pipe 89 slightly below that in the tank 87. A check valve 95 in the pipe 89 prevents the fuel from returning to the tank 90 when the pressure in the bore 80 becomes greater than that in the pipe 89.

As previously stated, the invention has been made with the two cycle engine particularly in mind, but it will be obvious that the mechanism by which the fuel is introduced into the engine and the pressure in the tank is replenished during part of the compression stroke is equally applicable to four cycle engines or to semi-Diesel engines.

What I claim is:

1. In a two cycle internal combustion engine, the combination with a main cylinder having an inlet and an exhaust port, a compressed air operated atomizer adapted to spray a mixture of fuel and air into the main cylinder, an air compressor adapted to force air unmixed with fuel through the inlet port, a relief valve between the air compressor and the main cylinder whereby the pressure of the air supplied to the main cylinder is controlled, yielding means acting on the relief valve, and means for varying the pressure exerted thereby to vary the pressure of the air delivered to the engine.

2. In two cycle internal combustion engine, the combination with the main cylinder having an inlet and an exhaust port, a compressed air operated atomizer adapted to spray a mixture of fuel and air into the main cylinder, an air compressor adapted to force air unmixed with fuel through the inlet port, a relief valve between the air compressor and the main cylinder whereby the pressure of the air supplied to the main cylinder is controlled, and means for varying the pressure exerted thereby to vary the pressure of the air delivered to the engine.

3. In a two cycle internal combustion engine, the combination of a cylinder having inlet and exhaust ports, an air compressor adapted to inject air through said inlet port, a fuel injection apparatus connected with said cylinder, a fuel throttle valve therefor, a relief valve between the air compressor and the cylinder, and common control mechanism for said fuel throttle valve and said air relief valve.

4. In combination with the working cylinder of an internal combustion engine, an air tank, a fuel jet, and connections from said air tank to said cylinder and fuel jet, whereby the air tank will inject air past the jet into the working cylinder during the first part of the compression stroke, and will be replenished with compressed air from the cylinder during a later part of the compression stroke.

5. In combination with the working cylinder of an internal combustion engine, an air tank, connections from said air tank to said cylinder, and a valve in said connections whereby the air tank will supply air under pressure to the working cylinder during the first part of the compression stroke and will be replenished with compressed air from the cylinder during a later part of said compression stroke.

6. In combination with the working cylinder of an internal combustion engine, an air tank, connections from said air tank to said cylinder, and a valve operated in time with the engine whereby the air tank will supply air under pressure to the working cylinder during the first part of the compression stroke and will be replenished with compressed air from the cylinder during a later part of said compression stroke.

7. In combination with the working cylinder of an internal combustion engine, an air tank, a fuel jet, connections from said air tank to said fuel jet and to said working cylinder, and a valve operating in time with the engine to close periodically the connection from the cylinder to the air tank, whereby the air tank will supply air under pressure to the working cylinder during the first part of the compression stroke and will be replenished with compressed air from the cylinder during a later part of the compression stroke.

8. In combination with the working cylinder of an internal combustion engine, an air tank, and connections from said air tank to said cylinder, said parts being arranged so that the air tank will supply air under pressure to the cylinder during the first part of the compression stroke and will in turn receive air under pressure from the working cylinder when the pressure in the working cylinder has reached a pressure in excess of the pressure in the air tank.

9. The combination of the working cylinder of an internal combustion engine with an atomizer to supply fuel thereto, said atomizer having fuel and air orifices, a fuel tank, the lower part of which is connected to the fuel orifice of the atomizer and the upper part of which is connected to the air orifice of the atomizer, and connections from said working cylinder to said tank by which the pressure in said tank is replenished during the last part of the compression stroke, and by which the atomizer is operated during another part of said stroke.

10. In an internal combustion engine, means for introducing a charge of fresh air into the working cylinder prior to the compression stroke, a pressure tank fuel injection apparatus and connections between said tank and said working cylinder such that the pressure tank delivers air to the working cylinder during a portion of the compression stroke during which the pressure in the tank exceeds that in the working cylinder and is replenished by the working cylinder during the same compression stroke when the pressure in the working cylinder exceeds that in the tank.

11. The combination with the working cylinder of an internal combustion engine, of an atomizer to inject fuel into said cylinder, said atomizer having air and fuel orifices, a fuel tank, the lower part of which is connected to the fuel orifice of the atomizer and the upper part of which is connected to the air orifice of the atomizer, an inlet valve between said atomizer and the said working cylinder, operating mechanism for said inlet valve, and a connection controlled by said inlet valve and leading from said working cylinder to said tank by which the pressure in said tank is replenished when the pressure in the working cylinder rises above a predetermined point.

12. The combination with the working cylinder of an internal combustion engine, of an atomizer to inject fuel into said cylinder, said atomizer having air and fuel orifices, a fuel tank, the lower part of which is connected to the fuel orifices of the atomizer and the upper part of which is connected to the air orifice of the atomizer, an inlet valve between said atomizer and the said working cylinder, operating mechanism for said inlet valve, a connection controlled by said inlet valve and leading from said working cylinder to said tank, and a check valve preventing flow from the fuel tank to the working cylinder through said connection.

13. In a two cycle internal combustion engine, the combination with a main cylinder having an inlet and an exhaust port, an air compressor supplying air unmixed with fuel through the inlet port, an atomizer having air and fuel orifices, an inlet valve between said atomizer and the said working cylinder, a fuel tank, connections from said tank to the air and fuel orifices of the atomizer, and a connection from the working cylinder to the said tank by which the pressure in said tank is replenished when the pressure in the cylinder rises above a predetermined point.

In testimony whereof I affix my signature.

GEORGE W. JESSUP, Jr.